Fig. 2

Aug. 2, 1932.　　　　O. THOMPSON　　　　1,869,399
AUTOMATIC CONTROL SYSTEM
Filed Feb. 1, 1929　　　　8 Sheets-Sheet 3

INVENTOR
OLOF THOMPSON
BY Darby & Darby
ATTORNEYS

Aug. 2, 1932.     O. THOMPSON     1,869,399
AUTOMATIC CONTROL SYSTEM
Filed Feb. 1, 1929     8 Sheets-Sheet 5

Patented Aug. 2, 1932

1,869,399

UNITED STATES PATENT OFFICE

OLOF THOMPSON, OF LONG ISLAND CITY, NEW YORK, ASSIGNOR TO TAKAMINE CORPORATION, OF LONG ISLAND CITY, NEW YORK, A CORPORATION OF NEW YORK

AUTOMATIC CONTROL SYSTEM

Application filed February 1, 1929. Serial No. 336,733.

This invention relates to remote control systems and particularly to systems for automatically controlling moving objects such as vehicles, elevators, or the like.

An object of the invention is to provide a novel selectively operable mechanism for controlling the starting and stopping of a power driven member.

While the selective system of the invention is described hereinafter, and is disclosed in the drawings as applied to a system for automatically controlling elevators, it will be understood that the same may be applied in other fields, where an object is to be moved from point to point, and the desired points are selected or marked by remotely controlled mechanism.

In the case of elevators, various systems of automatic control have heretofore been devised. For example, one type of system employs a two-part drum commutator, having the parts insulated from each other, and having in cooperation therewith, a set of contacts corresponding to each floor at which the elevator is to be stopped. In the case of very tall buildings, the size of commutator required for this purpose may become impracticable and the number of contacts likewise is very great, entailing a consequent increased liability to improper operation of the apparatus.

Accordingly it is one of the principal objects of the present invention to provide for elevators or the like, a system of automatic control which is more reliable, more economical, and more readily adaptable to different sizes of buildings or to different floor spacings.

The last mentioned object is achieved by utilizing a novel electro-mechanical selecting system which is positive in control, and requires a minimum of electrical circuits and contacts. The entire operation of starting and stopping the elevator being controlled by a single starting contact and a single stopping contact in the controller, regardless of the number of floors in the building.

A feature of the invention pertains to an electro-mechanical selector for starting an object from any one of a number of positions, and stopping the object at any one or more of a number of different positions. This selector is capable of wide use in other fields than elevator control and comprises in the main a plurality of members which are selectively positioned in accordance with the predetermined point or points at which the object is intended to stop. This selective positioning then automatically controls the starting movement of the object. The object while moving cooperates with the selective members to provide a self interrupting circuit which becomes effective at the required point to stop further movement of the object. The selector is, therefore, capable of use in such systems as automatic telephone exchanges, automatic train control systems, or any system requiring one position out of a number of positions to be selectively marked, after which the mechanism automatically "finds" the marked position.

In the case of automatic elevator systems, various means have heretofore been devised for enabling two or more persons located at different floors of a building, automatically to control an elevator simultaneously. For this purpose, so called "storing" arrangements have been provided, so that the signals given on the different floors are recorded and the elevator automatically operates until all the signals are "wiped-out". These systems, however, have required relatively complicated storing apparatus, and in the case of electric storing devices, the number of contacts increases prohibitively with the number of floors.

Accordingly, it is one of the features of the present invention to provide a relatively simple and more reliable mechanism for storing a plurality of signals than has heretofore been devised.

A still further feature is to provide an automatic control system for elevators or the like, in which standard control apparatus may be used, and by means of easy adjustments, which may be readily made, the apparatus can be made to function in different kinds of buildings. For example, in certain buildings the distances between floors may vary considerably. Heretofore it has been the usual practice to provide a member in drum form, which has mounted radially there-around the respective stop-control members for the different floors. In the case of very tall buildings, the size of drum required for this purpose becomes unwieldy and costly, and furthermore accurate adjustments as to the stopping points becomes very difficult because of the relative closeness of the stop-control members. This objection is overcome in the present invention by greatly increasing the effective traverse of the stop-controlling members without correspondingly increasing the drum diameter.

A still further feature pertains to the arrangement of elements which go to make up an efficient, simple and economical system for automatically controlling elevators or the like.

Other features and advantages of the invention will be revealed upon a consideration of the following description and the appended claims, together with the accompanying drawings.

For the purpose of illustration merely, and not by way of limitation, the drawings show the invention as applied to an elevator control system in which

Fig. 5$^a$ is a section on the line 5$^a$—5$^a$ of Fig. 5.

Fig. 5$^b$ is an enlarged fragmentary view of the cam mechanism employed in accordance with my invention

In the elevator art the use of a commutator or selector is now standard practice. Such a device is usually located in the pent house or other convenient place and is provided with a traveling member which moves synchronously with the elevator, its rate, distance, and direction of travel being controlled by and dependent upon the movement of the elevator. It is, likewise, customary in the art to use the commutator or selector to control various circuits or other instrumentalities in the elevator system. My invention is especially directed to mechanism of this sort which is particularly adaptable with minimum of equipment and maximum efficiency and positiveness of action for so-called automatic elevator control systems.

Figure 1:
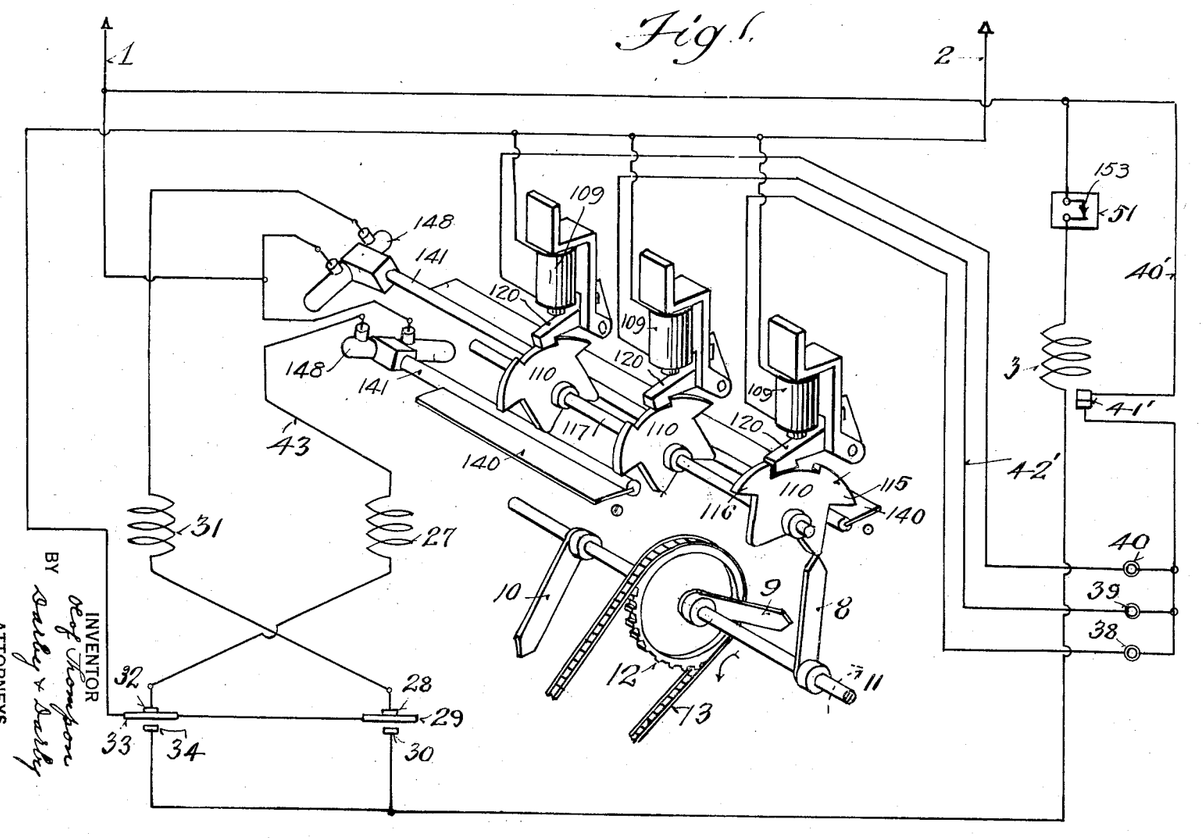
Fig. 1 is a partial perspective view in schematic form, showing a selector according to the present invention, together with certain circuits controlled thereby.

Referring to Fig. 1 of the drawings where I have schematically illustrated a system employing my invention with the parts shown largely diagrammatically for the purpose of enabling a clear understanding thereof, the numerals 1, 2 indicate conductors leading from a source of electric power for operating a driving motor which is to be selectively started and stopped under the control of the selector mechanism embodying my invention. The circuit of the motor is controlled by a main line relay 3, the circuit of which will be described hereinafter. The selector mechanism comprises a rod 117 carrying a plurality of selector members 110, there being one member for each floor. The members 110 are suitably spaced on the rod 117 and are capable of mutual, independent rocking motion thereon. The members are normally biased in either a right or left direction, depending upon the direction of movement of the elevator. That is, if the elevator is moving upwardly the members will be off center in one direction, while if the elevator is moving downwardly the members will be off center in the opposite direction. To effect the directional movement of the members 110 there is provided a series of fingers 8, 9, 10 mounted on a shaft 11, one finger being provided for each selector member 110. The shaft is provided with a sprocket wheel 12 which is actuated by a chain 13 which moves synchronously with the elevator movement. It will be seen that when the shaft 11 rotates in one direction fingers 8, 9 and 10 will cause the selector members to assume an off center position on one side of the rod 117, and when the shaft 11 is moved in the opposite direction the selector members will be moved to the off center position on the other side of the shaft 117. This is effected by means of ears formed on opposite sides of the selector members 110 as shown. The selector members are provided with a groove in the surface thereof, in which groove fits an armature 120 when its magnet 109 is deenergized. The armature 120 serves as a detent to limit the rocking movement of the member 110 in both directions as long as the magnet 109 is deenergized. Positioned under the respective edges 115 and 116 of the rocking member 110, so that any member 110 may actuate the same, are vanes 140 mounted on shafts 141. The vanes are provided to rock the shafts 141 if any one or more of the members 110 are allowed to rock on their shaft 117 by withdrawal of the armature 120 by the energization of one or more of the magnets 109. Located at the end of the shafts 141 are mercury switches 148 normally positioned with the contacts thereof open circuited, and held in their normal position by gravity of the mercury switches. If, however, one of the members 110 is allowed to drop and hit its vanes 140 the mercury switch is rocked thereby, and its contacts closed.

Now, when shaft 11 is rotated an amount equivalent to the distance of travel of the car so that the finger 8, 9 or 10, as the case may be, corresponding to the particular magnet 109 which has been energized, the finger rocks its member 110 so that it is lifted from its vane 140 and latched in its raised position by the armature 120 of the magnet 109 which has now become deenergized and the mercury switch 148 which had been actuated by the movement of the vein assumes its normal circuited position and the circuit which it has controlled becomes open circuited.

It will be apparent from the foregoing that, if the energizing of the magnet 109 is effected by depressing a push button on a floor in an automatic elevator system, and if the mercury switch 148 is utilized to control a circuit which either directly or indirectly controls the circuit of the hoisting motor of the elevator, the operation which is thus effected will be as follows. If we assume that the elevator is at the ground floor and the push button on the third floor is depressed the magnet 109 of the third floor becomes energized and withdraws its armature 120 allowing its rocking member 110 to drop by gravity so that the edge 116 thereof hits the vane 140, thereby rocking its shaft 141 and coincidentally therewith the mercury switch 148, closing the circuit controlled by the mercury switch 148. In the simple illustration given, when the above condition has been obtained current will flow from a source through wire 1 to the mercury switch 148, through wire 43, relay 27, contacts 32, 33 to the opposite side of the line 2, all of this being effected by a mere depression of the button 38, 39, or 40, corresponding to the button on the floor from which a signal has been given. Now when the car reaches the floor from which the signal has been given the member 8, 9, or 10, depending upon from which floor the signal has been given, comes in contact with the lower edge 14 of the member 110 which has been dropped and rocks it about its shaft 117 until the armature 120, which was allowed to drop because its magnet 109 was maintained energized but momentarily in a manner customary with push buttons, engages the member 110 and holds it in its retracted position.

It will be seen that the push buttons and switches, (one for each floor) 38, 39 and 40 are at all times supplied with current from source 1, wire 40', through switch 41, through the push button switches, their associated magnets 109, to return wire 2. The switch 41' is provided to make it possible to disconnect all the push button switches from the source of power if desired. Obviously this switch may be dispensed with.

The hoisting motor for the elevator is actuated when current flows through the coil 3. Thus the coil 3 may designate the hoisting motor winding or a relay which in any well known manner when energized closes the circuit of the hoisting motor. Included in the circuit of the coil 3 is a switch 153 which (as will be hereinafter described) is normally closed, but which, when the car reaches the floor from which a signal has been sent, is opened to open the circuit of the coil 3 and hence stop the motor. The switch 153 and coil 3 are included in a circuit with the directional switches 32, 33, 34 and 28, 29, 30.

The apparatus is shown in Fig. 1 in its entirely normal condition, that is, when no current is applied to the supply wires 1 and 2. Under this condition the armatures 29 and 33 are in engagement with the associated contacts 28 and 32 respectively. When, however, a call is initiated at any floor, one or the other of the marked switches 148 is operated, depending upon the relative position of the car and the landing at which the button is pressed. For example, assuming that a button is pressed to bring the car upwardly, then the switch 148 in circuit with the magnet 27 is operated, thus supplying current from the wire 1 through the switch 148, magnet 27, contacts 32 and 33 to the other supply wire 2. Magnet 27 therefore operates, and in doing so transfers the contact 29 to contact 30, thus providing a lockout circuit for the down control magnet 31, as hereinbelow described in connection with Fig. 11. If the call had been such as to require the elevator to move downwardly, then obviously the other marked switch 148 in circuit with magnet 31 would be operated, thus providing a lock-out circuit for the up control magnet 27.

It is believed that the foregoing simple illustration will enable a clear understanding of the operation of the system embodying my invention and while parts are shown on the drawings which have not yet been described they will be described in connection with the commercial adaptation of the system which forms the subject matter of the remainder of the drawings.

Referring more particularly to Figs. 2 to 10, a detail description will now be given of one preferred embodiment of a commercial installation carrying out the invention. The means for supporting and housing the selective mechanism comprises a channel frame work consisting of the vertical standards 101, which are rigidly united at their ends by the cross frame pieces 102, 103, 104, and by the longitudinal frame members 105, 106. This frame work may be constructed of channel members united in any suitable manner, either by bolting, riveting, or the like. The top of the frame work is enclosed by a sheet metal cover 107, to which is attached the longitudinally extending right-angle member 108.

Figure 2:
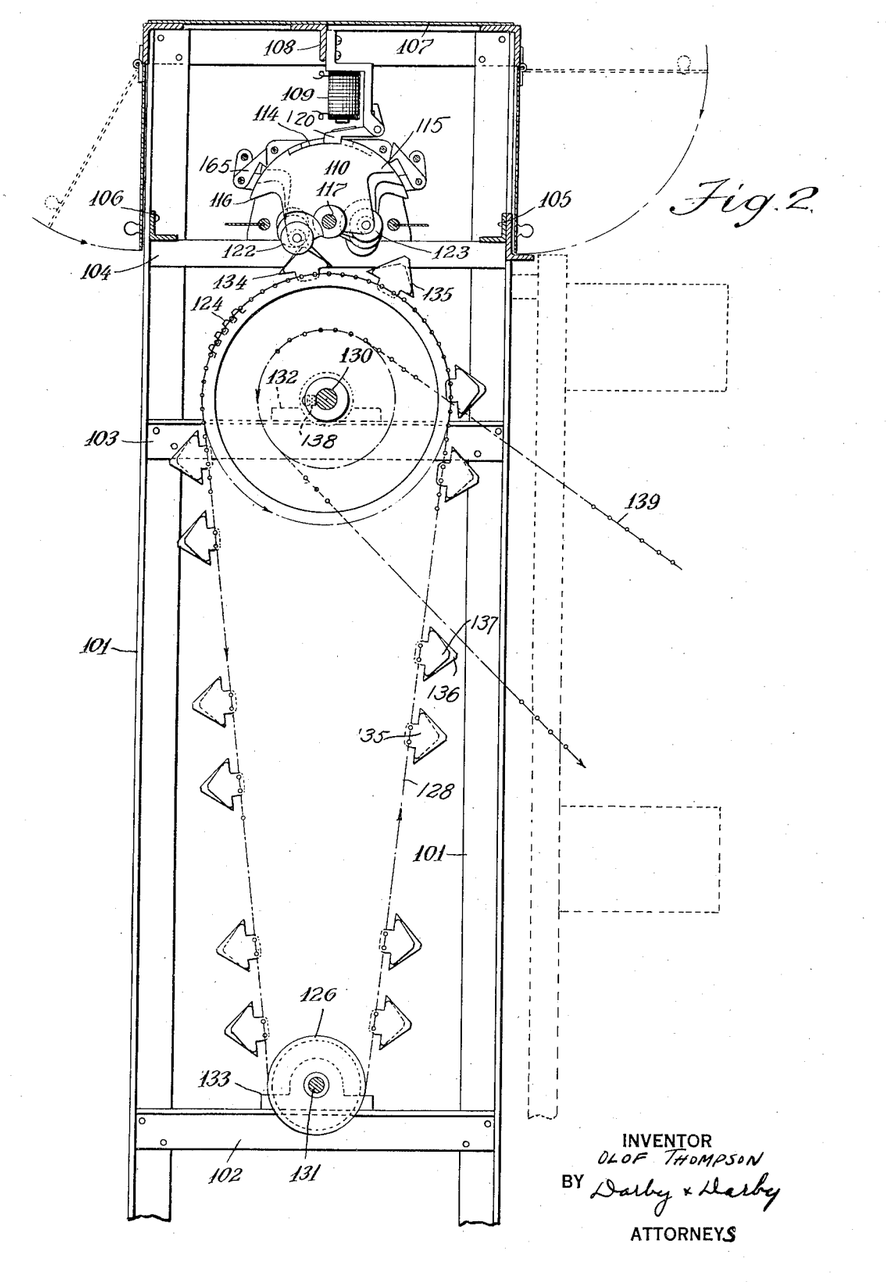
Fig. 2 is a partial end section of a selector or commutator mechanism embodying my invention. This view is taken on the line 2—2, Fig. 4, looking in the direction of the arrows.
Figure 3:
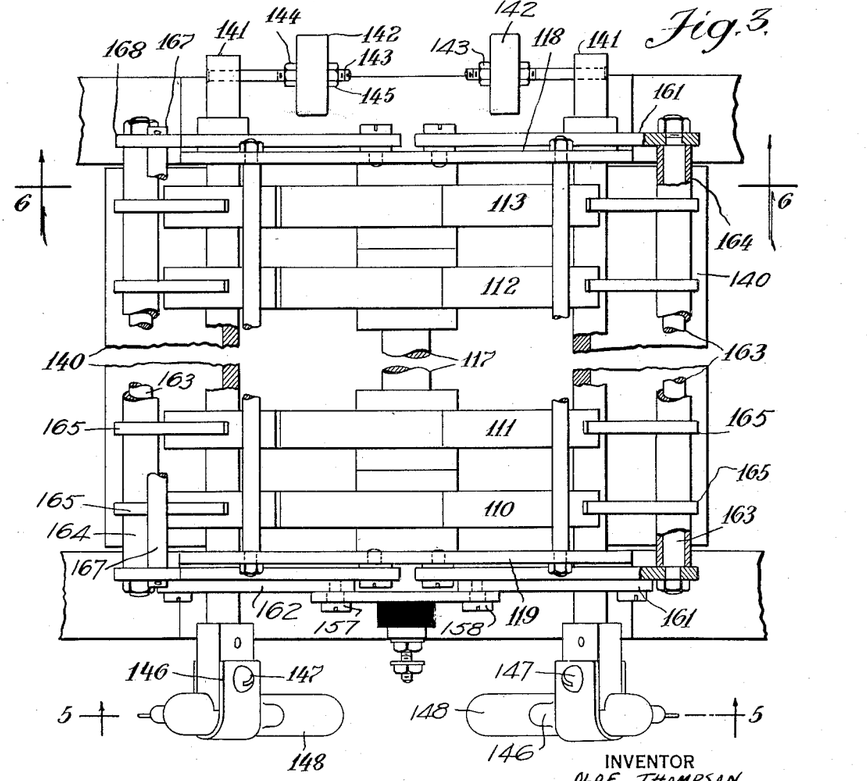
Fig. 3 is a partial top plan view of the mechanism shown in Fig. 5, looking down on the line 3—3.
Figure 4:
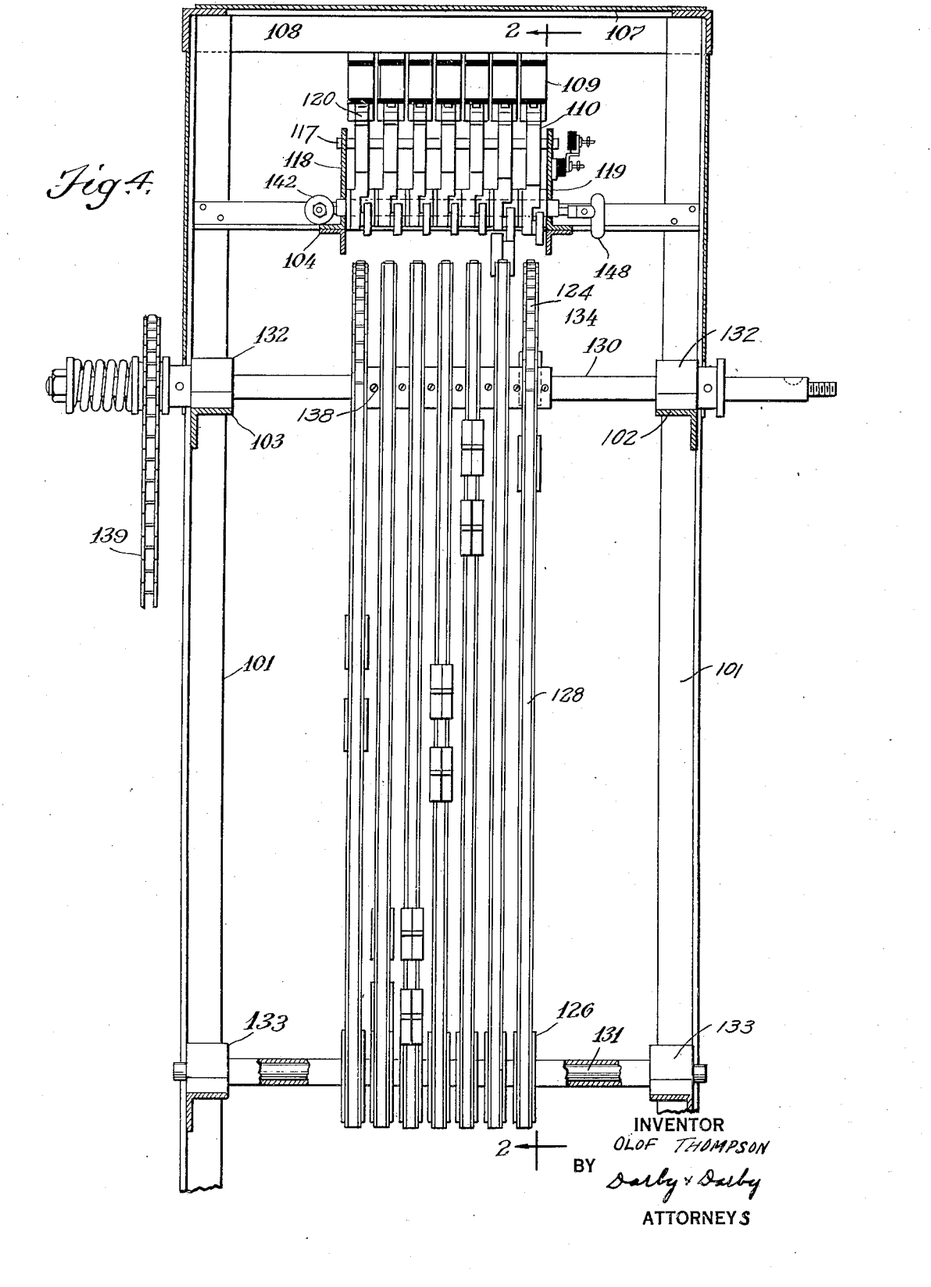
Fig. 4 is a rear view of the mechanism showing the arrangement of cam control, driving chains, and the corresponding selective devices.
Figures 9, 10:
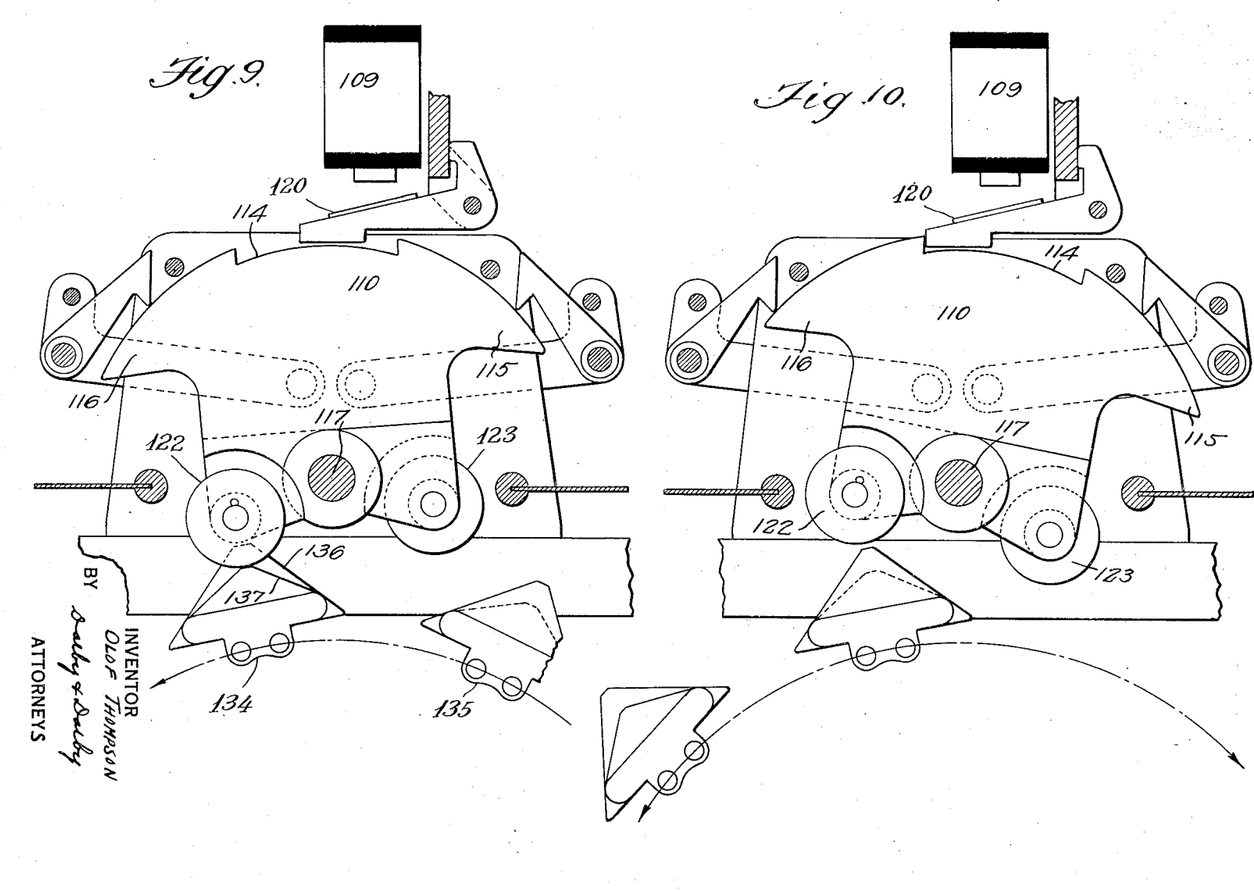

The upper part of the frame work included between the channels 104 and the cover 107 provides a housing for the selective mechanism, the main parts of which comprise a series of electro-magnets 109, one for each floor at which the elevator is to be stopped, and a corresponding series of selectively operable members 110. As shown more clearly in Figs. 2 and 4, the electro-magnets 109 are attached in any suitable manner to the downwardly extending flange of the member 108. The series of selective members 110 are preferably shaped as shown in Figs. 2, 9 and 10 and each has a curved upper edge having a notch 114 cut therein. The upper edge of each of the selective members terminates in projections 115, 116, the function of which will be described hereinafter.

The selective members 110 are mounted for mutually independent rocking motion on a longitudinally extending bar 117, which is fastened at opposite ends to the end frame members 118 and 119. The selective members are mounted on the rod 117 in spaced relation and with their upper edges in registry with the armatures 120, of the corresponding electro-magnets 109, as shown more clearly in Fig. 4.

For the purpose of rocking the members 110, each is provided at its lower corners with follower rollers 122, 123, mounted on opposite faces of the respective members. Associated with each member 110 is a cam operating mechanism comprising a relatively large upper sprocket wheel 124, and a lower sprocket wheel 126, (see Fig. 4). Passing around each set of sprocket wheels is a chain 128. The shafts 130 and 131 on which the sprocket wheels are mounted for rotation are suitably journaled in bearing members 132, 133, attached to the frame members 103 and 102 respectively.

Figures 7, 8:
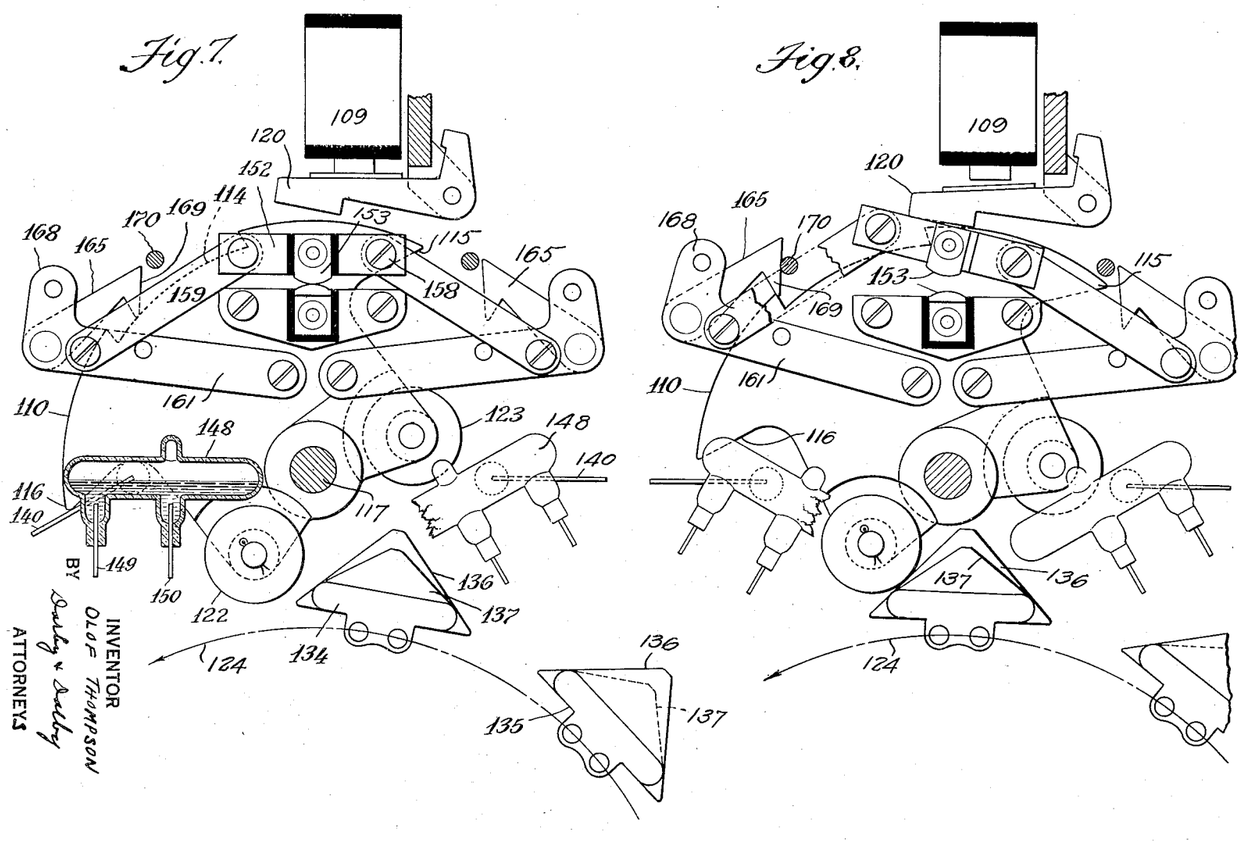
Figs. 7, 8, 9 and 10 are views showing one of the selectors in four successive positions to illustrate its cycle of movement in controlling the starting and stopping circuits.

Each chain 128 has adjustably attached thereto cams 134, 135, each cam having a high and low face 136 and 137 respectively. The cams are mounted on the chain, so that the low faces of successive cams are on opposite sides. Thus as shown in Fig. 7, the low face 137 of cam 134 is about to engage roller 122 and when it does, the roller 123 is in alignment with the low face of cam 135. However, when cam 135 comes into registry with roller 122, the high face of cam 135 cooperates therewith.

Each sprocket wheel 124 is independently adjustably fastened on the shaft 130 by means of a set screw 138, so that the positions of the sets of cams on the respective chains may be adjustable with respect to one another to correspond with the spacing between the floors of the building in which the mechanism is designed to operate. For example, if all the floors are equally spaced apart, then the cam sets, when the device is normal, are spaced apart equal distances corresponding to the floor spacing and the sprocket wheels are then fastened by means of their set screws in this position. If, however, the building in which the device is to work has unequal floor spacings, then all that is necessary to enable the device to properly function is to loosen the proper sprocket wheel corresponding to the floor in question, and either advance or retard the associated cam set, whereupon, the sprocket wheel is fastened in its adjusted position. By means of a suitable reduction gearing and the chain drive 139, the shaft 130 may be driven from the elevator motor, but at a reduced rate, so that the length of each chain corresponds to the complete upward movement of the elevator.

Figure 5:
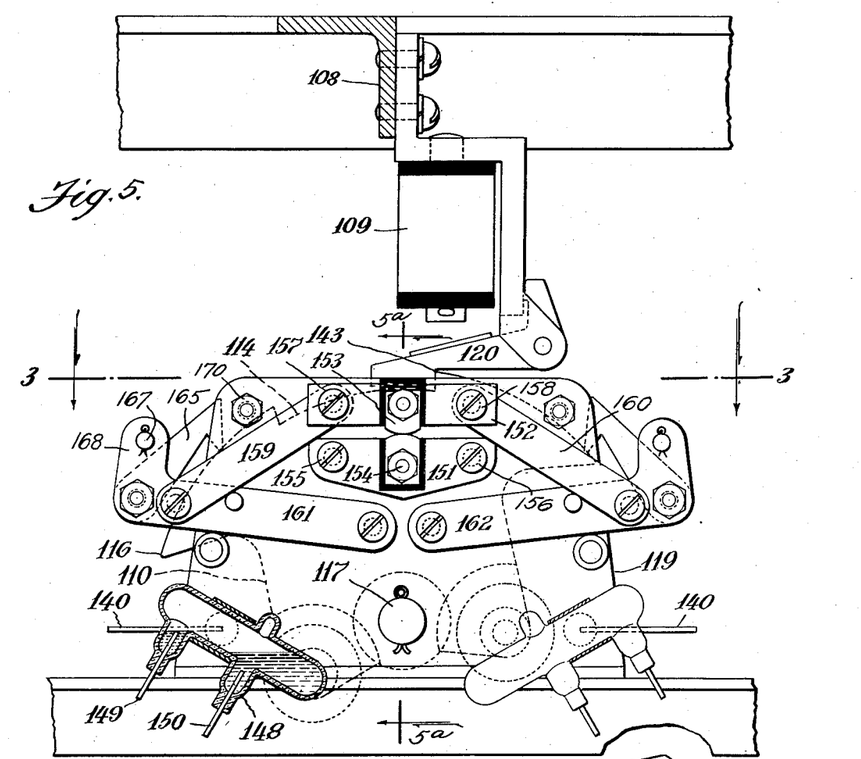
Fig. 5 is a sectional view taken on the line 5—5, Fig. 3, showing details of the starting and stopping control mechanism.
Figures 5A, 5B:
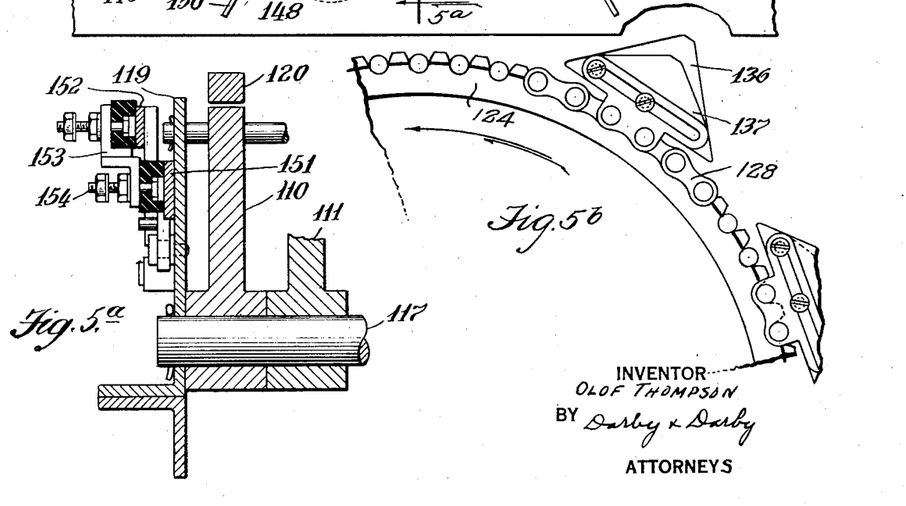

For the purpose of simplifying the description it will be assumed that when the sprocket wheels are rotating in the direction of the arrow (Fig. 2) that the elevator is moving in an upward direction, and it will be further assumed that the elevator is in its lowermost position in which case all the selective members 110, are in the positions shown in dotted lines in Fig. 5. In this position it will be seen that the member 110, being off center tends to rotate in a counterclock-wise direction to cause its left hand projection 116 to engage the contact operating bail 140 to be described hereinafter. However, for the present it will be assumed that all the signal buttons at the respective floors are normal and that consequently the armatures 120, of the electro-magnets 109, are in their gravitated positions, as shown in Fig. 5, in which case, lip 143 on each armature engages the right hand edge of the notch 114 to restrain the selective members 110 from engaging the bail 140. As soon as a signal button is operated the corresponding electro-magnet is energized and attracts its armature, whereupon the associated member 110 is free to rock under gravity to the position shown in Fig. 7.

Figure 6:
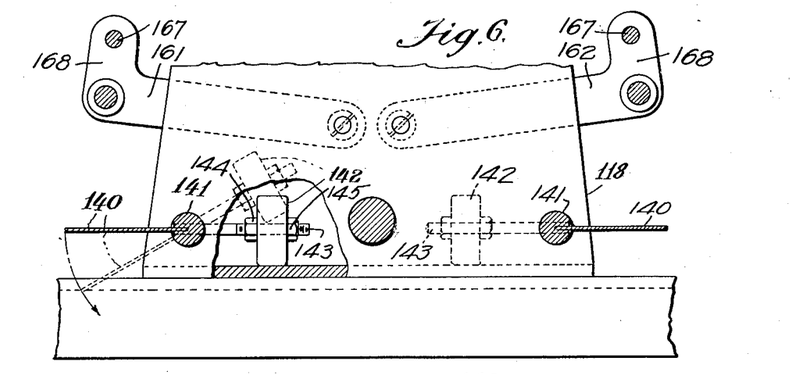
Fig. 6 is a partial sectional view along the lines 6—6 of Fig. 3.

Prior to discussing the effects of this preliminary or preselecting movement of the members, it will be necessary to describe the contact arrangement to be controlled thereby. As shown clearly in Fig. 3, there is journaled in the end frames 118 and 119, a longitudinally extending shaft 141 which carries the vane or bail 140, there being provided a similar shaft and bail cooperating with the selective members on the opposite side. Each bail is normally retained in a substantially horizontal position, as shown in Fig. 6, by means of a counterweight 142, which is suitably attached to the shaft 141.

The weight 142 is preferably adjustably mounted on screw threaded arm 143, and retained in position thereon by means of locking nuts 144 and 145. The opposite end of each of the shafts 141 has secured thereto by means of the U-shaped bracket 146 and the screw 147, a mercury switch member 148. As shown more clearly in Fig. 5, when the bails 140 are in their normal horizontal positions, the respective mercury switches are in an inclined position, in which the mercury is out of contact with one of the lead wires 149, but is in contact with the other lead wire 150. The left hand mercury switch 148 controls the up-drive circuit of the elevator, while the right hand switch controls the down-drive circuit. It will be seen, therefore, that the contacts 148 are common to all the selectors, regardless of the number of floors in the building.

Returning now to the point where a signal button is operated and the member 110 (Fig. 5) moved to position shown in Fig. 7. While thus moving, it will be noted that the associated dog 165 has dropped into the notch 114, and that the projecting end 116 of the member 110 has engaged the bail 140 to cause the rotation of the mercury switch 148 to a horizontal position, wherein the circuit is completed between the conductors 149 and 150.

Thus it will be seen that on energizing any magnet 109, for example by depressing its push button located on one of the floors, the mercury switch is closed and hence the circuit to the motor controller of the elevator is closed and the elevator proceeds on its way. It will be seen further that when the elevator approaches the floor from which the signal has been sent the cam member 134, caused to travel by the synchronous connection between the elevator and the chain upon which it is mounted, comes under the member 110 rocking it about its shaft 117 until it is again engaged by the armature 120 of the magnet 109. This, of course, allows the mercury switch 148 to assume its normally open position and the circuit to the hoisting motor is thus opened and the elevator comes to rest opposite the floor from which the signal has been sent.

In the event that more than one signal has been sent from the floors, that is a signal from more than one floor has been received whereby more than one rocking member 110 has been released to actuate the mercury switch controlling the car hoisting motor circuit, it is obvious that means must be provided for stopping the car at a floor from which a signal has been sent although only one member 110 has been rocked to its retracted position. In other words, when the car reaches a floor from which a signal has been sent and its rocking member 110 has been forced back to its retracted position, it is obvious that the mercury switch 148 will still be in its closed position if any other rocking member 110 has been released.

The mechanism which I have provided for this purpose, viz: to insure the stopping of the car at any floor from which a signal has been sent irrespective of whether or not other signals have likewise been registered, I provide a contact switch 153 which is common to all of the members 110 and which is actuated in the following way. There is provided a fixed contact member 151 (see Fig. 5) located below a movable contact member 152. While any form of contact may be used for this purpose it is preferred to employ removable contact members 153 which are held in the respective holders 151, 152 by means of retaining screws 154. The lower contact holder is rigidly fastened to the outer face of the end frame member 119 by means of screws 155, 156, while the upper contact holder is pivotally attached at opposite ends by means of suitable screws 157, 158 to corresponding link members 159, 160, which link members at its lower ends are pivotally attached to the side arms 161, 162 of a respective rocking frame which is formed with the longitudinally extending rod 163 (see Figs. 3). Loosely mounted on the rod 163 between the side arms 161 is the sleeve 164 which has rigidly attached thereto a series of dogs 165, one for each member 110. Consequently as the frame rocks back and forth the contacts are raised and at the same time are capable of rotating with respect to the rod 163. For the purpose of limiting the backward movement of the dogs there is provided a rod 167 which extends between the offset ends 168 of the rocking frame. Positioned in front of the inclined faces 169 of the dogs is a tie rod 170.

The elevator in moving up rotates the sprocket wheels 124 and correspondingly advances the cams 134, 135. For the present it will be assumed that the signal was operated on the first floor corresponding to the first selector 110. When the elevator reaches the vicinity of the first floor, the cam 137 engages the roller 122 (Fig. 7) and rotates the member 110 in a clock-wise direction, whereupon the left hand end of the notch 114 engages the dog 169 and rotates the rocking frame including members 161 in a clock-wise direction. This movement of the rocking frame is transmitted by the link 159 to the upper contact holder 152 which thereupon rotates around the screw 158 as pivot to the position shown in Fig. 8, in which the contacts 153 are open. The opening of these contacts controls the main-line circuit of the elevator as hereinafter described. However, the member 110, together with the dog 165 continues to rotate in a clock-wise direction (Fig. 8) until the rod 170 engages the dog 165 and cams the said dog on to the raised end of the member 110. The armature 120 meanwhile rides on the raised surface of the right hand end of member 110.

Figure 11:
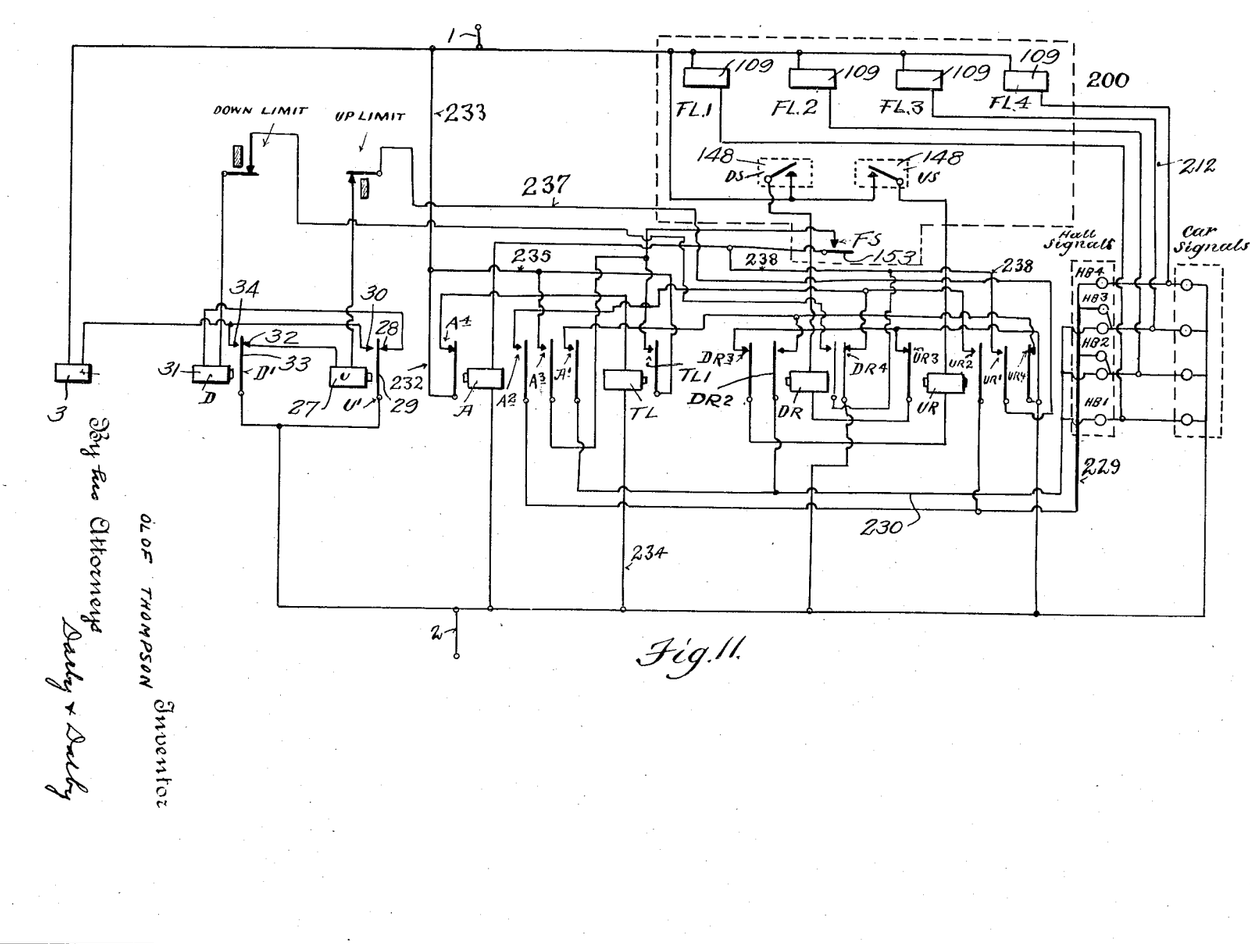
Fig. 11 is a wiring diagram showing the detailed circuits designed to cooperate with the apparatus of Figs. 2 to 9, inclusive.

Fig. 11 shows the control circuits of the controller, with all contacts in their normal position with the actuating coils deenergized. The apparatus within dotted rectangle 200 corresponds to the controlling mechanism of Figs. 2-10. Magnets FL—1 to FL—4 correspond to magnets 109, switches DS and US correspond to the mercury switches, and FS is the stop contact 153.

The relay TL is a time limit relay, i. e., after the coil is energized there is a delay before the contact closes. When the supply circuit is energized the following circuit is completed: Main-line conductor 1, 233, 232, A4, TL, 234, 2. Coil TL is now energized. After a delay of a few seconds the contact TL—1 makes, completing the circuit 1, 233, 235, TL—1, FS, A, 2.

The coil of the auxiliary relay A is now energized, contacts A—1, A—2 and A—3 make, while contact A—4 breaks.

The breaking of contact A—4 interrupts the current to the coil TL, and the time limit relay returns to its open position. Contact A—3 maintains the circuit through coil A. The closing of contacts A—1, and A—2 allows current to flow through the wires 230 and 229 respectively. (230 and 229 are the common wires for the hall buttons.)

The controller is now ready to receive calls from either car or hall buttons.

By pressing a button, for example on the third floor, the circuit 2, UR—4, A—1, 230, 212, FL—3, 1, is closed. The floor relay 109 will release the locking mechanism for the third floor selector member 110. This member drops down to one side or the other, depending on the position of the elevator above or below the third floor. In this manner one of the two selector switches 148, (DS or US), is closed. It will be seen that the same action will take place, whichever one of the two buttons at the third floor is pressed.

If, for example, the elevator was at the first floor landing, the switch US will close, energizing the up direction relay coil UR. Contacts UR—1 and UR—2 make, contacts UR—3 and UR—4 break. Contact UR—3 and UR—4 prevent interference by open circuiting the down direction relay DR and the common wire for the "down" push buttons at the landings. Contact UR—1 completes the following circuit to the up direction switch coil U. 2, D1, U, upper limiting contact, 237, UR—1, 238, FS, A—3, 1. The contact U makes, completing the circuit to the main-line switch coil 3. The main line switch closes and the elevator starts going up.

When the elevator arrives at the third floor landing the third floor selector member will be mechanically lifted back to its original position. This will break the contact FS, thus dropping out the relay A and the up direction magnet U. This opens the circuit of the main-line switch 3 and the elevator stops. If no other "up calls" were made while the elevator was running, all floor weights will be in their original position and mercury switch US (148) will be open.

The controller is now ready for another cycle of operation.

It will be seen that wire 229 which is the common wire for the "up" push buttons at the floor landing is kept alive while the car is going up. If, therefore, while the car is between the first and second floors on its way up, the "up" button at the second floor landing is pressed the second floor selector member will drop. When the elevator arrives at the second floor landing, this member will be mechanically returned to its original position, breaking the contact FS mechanically. This will stop the elevator at the second floor.

The third floor selector member still being in its released position will keep the switch US closed, and the up direction relay UR remains closed. The relay A having dropped out when contact FS opened, makes contact A—4, the time limit relay TL is energized, after a few seconds contact TL' makes, and the same series of operation as when the elevator left the first floor takes place. The elevator will thus automatically continue to the third floor.

The function of contact UR—2 is to keep wire 229 alive during the time relay A is open, when the elevator makes the intermediate stop at the second landing.

The buttons in the car are always operative.

What is claimed is:

1. In a system of remote control for moving objects, a selector comprising a member normally movable, independently of said object, means for moving said member to a preselecting position to cause movement of said object, means responsive to said movement for coupling said member to said object, and means responsive to the combined movement of said object and member for stopping said object after a predetermined distance of travel.

2. In a system for remotely controlling an electrically moved object, a selector comprising a plurality of independently movable members each corresponding to a position for said object, means for moving one or more of said members to a preselecting position, a switch common to all said members, means responsive to the moving of one member to a preselecting position for operating said switch to initiate movement of said object, another switch common to all said members for controlling the actuating circuit of said electrically moved object, and means for opening said last mentioned switch when said object reaches one of the desired positions.

3. In a system for remotely controlling a moving object, a selector comprising a plurality of independently movable selector members one for each position in which said object is to be stopped, start control means common to all said members, a stop control member common to all said selector members, means to selectively set one or more of said selector members, means effective upon the setting for rendering said start control means effective, and means conjointly operated by the setting of said members and the movement of said object for rendering said stopping means effective.

4. In a system for remotely controlling a moving object, means for storing signals from a plurality of points at which said object is to stop comprising a plurality of independently movable selector members, means controlled by a prior movement of said object for partially moving said selector to a preselecting position, and means responsive to signal impulses for completing the movement to a preselecting position and to initiate a subsequent movement of the object.

5. In combination a vehicle, means for moving said vehicle, means for selectively starting and stopping said vehicle comprising a plurality of selector members, means responsive to signal impulses for setting said members, and means effective upon setting for moving the vehicle, and means actuated by the movement of the vehicle for resetting said members.

6. In an automatic vehicle control system the combination of a motor circuit for said vehicle, a station selector for said vehicle comprising a plurality of selectively shiftable members, means controlled by the vehicle for mechanically shifting said members to a preselecting position dependent upon the direction of travel of the vehicle, and means actuated by further movement of said members from preselecting position for controlling said motor circuit.

7. In an automatic vehicle system the combination of said vehicle, a station selector for said vehicle comprising a plurality of selectively shiftable members, means controlled by the vehicle for mechanically shifting said members to a preselecting position dependent upon the direction of travel of the vehicle, remotely controlled means for causing said members to move from their preselecting position, and means actuated thereby for controlling said motor circuit.

8. In an automatic elevator control system, a selector unit mechanism comprising a pivotally mounted member normally tending to rotate about said pivot, means for normally restraining said member against such rotation, signal means for controlling said restraining means to allow said member to rotate, and means effective upon a predetermined rotation for starting the elevator.

9. In an automatic elevator control system, a selector unit mechanism comprising a pivotally mounted member normally tending to rotate about said pivot, means for normally restraining said member against such rotation, signal means for controlling said restraining means to allow said member to rotate, means effective upon a predetermined rotation for starting the elevator, means responsive to the starting of said elevator for rotating said member in a reverse direction, and means effective upon a predetermined degree of rotation in the reversed direction for stopping the elevator.

10. In an automatic elevator control system a selective mechanism comprising a member normally biassed to assume an elevator starting position, signal controlled means for restraining said member from assuming the starting position, two starting switches adapted to be operated by said member, and means for moving said member in a preliminary movement without operating the said switches.

11. In an automatic elevator control system a selective member, an up-control switch, a down-control switch, means for moving said member without affecting said switches, and means effective when the elevator is to be operated for moving said member to operate one of said swtiches.

12. In an automatic elevator control system a plurality of pivotally mounted selector members each adapted to assume one position for up-motion of the elevator and a different position for down-motion, an up-control switch associated with each member, a down-control switch associated with each member, means for selectively marking one or more of said members to start and selectively stop the elevator at desired floors, means controlled by the elevator movement for oscillating the non-marked members without operating said switches, and means for oscillating the marked members when the desired floors are reached to stop said elevator thereat.

13. In an automatic elevator control system a plurality of selectively operable members mounted for mutually independent movement, an up start-control member, a down start-control member, a stop-control member, means controlled by a prior downward movement of the elevator for biassing certain of said selector members towards the up-control member, the other selector members being biassed towards the down-control member, means responsive to a signal for allowing a predetermined one of said selector members to complete engagement with the control member towards which it is biassed, to initiate movement of the elevator, and means effective when the desired floor is reached for causing said predetermined member to control the stopping of the elevator.

14. In an automatic elevator control system a plurality of pivotally mounted selector members, means at each floor for causing a desired one of said selectors to be moved to starting position without affecting the others, a stop-control switch common to all said members, and means controlled by the elevator movement for causing said switch to be operated only by said desired selector.

15. In an automatic elevator control system a plurality of individually movable selector members, a switch-operating member adapted to be actuated by all of said members, a switch controlled by said member, and signal controlled means for bringing one or more of said selector members into engagement with said switch-operating member.

16. A control system according to claim 15, characterized in that each selector member is mounted for reciprocating movement, and a switch-operating member is mounted on both sides of said members.

17. A control system according to claim 15, characterized in that all said members are mounted for rocking movement on a common shaft.

18. In an automatic elevator control system, means for selectively starting and stopping said elevators at different floors and means for adjusting the first-mentioned means to correspond with the floor-spacing and including a set of separated driving members and an endless member passing around each driving member.

19. A control system according to claim 18, characterized in that each endless member is in the form of a traveling chain carrying a set of controlling cams.

20. In an elevator control system, means for automatically and selectively starting and stopping the elevator, means for controlling the operation of said selective means comprising a plurality of cam-sets each mounted on an associated traveling chain or belt and means for changing the spacing between said cam-sets to correspond with the floor spacing.

21. In an elevator control system the combination of a plurality of selectively operable members, and means associated with each member for timing the operation thereof with respect to the elevator movement comprising a traveling chain or belt carrying a set of cams, and means for adjusting the relative spacings between the cams on the several chains.

22. In a system for remotely controlling the starting and stopping of a movable object, a plurality of independently movable selector elements closely grouped together, one being provided for each stopping point of the movable object, a starting switch for controlling the supply of power to move said movable object, a stopping switch for controlling the supply of power to said movable object, manually controlled means for causing the movement of one or more of said selector elements to close said starting switch, and means actuated by the movable object reaching the stopping point corresponding to a moved selector element for actuating said stopping switch.

23. In an electric elevator system, an elevator, a plurality of movable selector elements, one provided for each floor served by the elevator, push button switches on each floor for controlling their respective selector elements, a normally open circuited starting switch for controlling the supply of current to the hoisting motor of said elevator, a normally closed stopping switch for likewise controlling said supply, means actuated by the closing of one or more of said push button switches for moving the corresponding selector elements, means actuated thereby for closing said starting switch, means actuated by the elevator reaching a floor corresponding to one of the push button switches which had been closed for moving the selector element corresponding to said floor, and means actuated thereby for opening said stopping switch.

24. In an automatic elevator control system a selecting member for controlling the starting and stopping of said elevator, a starting switch, a stopping switch controlled by said member, means controlled by the direction of movement of the elevator for moving said member independently of said switches to a preliminary direction controlling position, and manually controlled means for releasing said member to cause said switches to be operated.

25. In an automatic elevator control system, a selecting member, a starting switch, a stopping switch, means controlled by the direction of movement of the elevator for moving said member independently of said switches to a preliminary direction controlling position, and means controlled by the elevator movement for moving said member to cause said stopping switch to be operated.

26. In an automatic elevator control system a selecting member, a normally open starting switch, a normally closed stopping switch, means controlled by the direction of movement of the elevator for moving said member independently of said switches to a preliminary direction controlling position, manually controlled means for releasing said member to cause said starting switch to be operated, and means controlled by the movement of the elevator for releasing said member to cause said stopping switch to open.

In testimony whereof I have hereunto set my hand on this 30th day of January, A. D., 1929.

OLOF THOMPSON.